US006714291B2

(12) United States Patent
Castagnoli et al.

(10) Patent No.: US 6,714,291 B2
(45) Date of Patent: Mar. 30, 2004

(54) PROCESS FOR IDENTIFYING A SPECIFIC LIGHT SIGNAL USED IN A LINEAR OPTICAL SENSOR OF GONIOMETER FROM AMONG OTHER POTENTIALLY DISTURBING LIGHT SIGNALS

(75) Inventors: Norberto Castagnoli, Correggio (IT); Francesco Braghiroli, Reggio Emilia (IT); Fabrizio Cagnolati, Cadelbosco Di Sopra (IT)

(73) Assignee: Snap-on Equipment S.r.l., Correggio (IT)

( * ) Notice: Subject to any disclaimer, the term of this patent is extended or adjusted under 35 U.S.C. 154(b) by 24 days.

(21) Appl. No.: 10/123,455

(22) Filed: Apr. 17, 2002

(65) Prior Publication Data
US 2002/0167658 A1 Nov. 14, 2002

(30) Foreign Application Priority Data
May 11, 2001 (IT) .................................. MO2001A0093

(51) Int. Cl.$^7$ ........................... G01B 11/26; G01C 1/00; G01C 15/00
(52) U.S. Cl. ..................................... 356/139.09; 33/286
(58) Field of Search ............................ 356/139.09, 138, 356/140; 33/286, 203

(56) References Cited

U.S. PATENT DOCUMENTS

| | | | |
|---|---|---|---|
| 4,898,464 A | | 2/1990 | Thorne et al. |
| 5,018,853 A | * | 5/1991 | Hechel et al. ............... 356/155 |
| 5,177,558 A | * | 1/1993 | Hill ....................... 356/139.09 |
| 5,489,983 A | * | 2/1996 | McClenahan et al. . 356/139.09 |
| 5,519,489 A | * | 5/1996 | McClenahan et al. . 356/139.09 |
| 5,608,528 A | | 3/1997 | Ogawa |
| 5,781,286 A | | 7/1998 | Knestel |

* cited by examiner

Primary Examiner—Thomas H. Tarcza
Assistant Examiner—Brian Andrea
(74) Attorney, Agent, or Firm—Browdy and Neimark, P.L.L.C.

(57) ABSTRACT

The process of the invention can be used for measuring angles characteristic of wheels of a motor vehicle, in which a light signal is produced by a light beam having a predetermined direction with respect to which an angle to be measured is measured, the angle being formed between the direction of the light beam and a reference axis of the goniometer which reference axis is perpendicular to the linear optical sensor. The linear optical sensor is constituted by a plurality of contiguous and aligned photo-sensitive elements, by means of which elements an image of the light signal can be read. The image is constituted by an ordered totality of intensities of incident radiations recorded on the photo-sensitive elements. Measurement of the angle is a direct function of a distance of the image from an origin for measurement of distances in longitudinal direction, which is defined by an intersection of the reference axis with a longitudinal axis of the sensor. The process comprises: reading of at least two images at known and different times; a comparison between the at least two images; data processing of data which emerges from the comparison by means of a converging process towards a result defining environmental disturbance, making the environmental disturbance distinguishable from the light signal and vice versa.

15 Claims, 2 Drawing Sheets

PROCESS FOR IDENTIFYING A SPECIFIC LIGHT SIGNAL USED IN A LINEAR OPTICAL SENSOR OF GONIOMETER FROM AMONG OTHER POTENTIALLY DISTURBING LIGHT SIGNALS

BACKGROUND OF THE INVENTION

The invention relates to a process for identifying disturbance from other light sources when taking readings from a linear optical sensor of a goniometer, of a type used for measuring angles of wheels of motor vehicles. In this kind of sensor, the light originates in a beam aimed in a predetermined direction, from which an angle to be measured can be determined—the angle between the direction of the beam and an axis of reference of the goniometer which is perpendicular to the linear optical sensor. The sensor is usually constituted by a plurality of contiguous and aligned photo-sensitive elements, through which an "image" of the light source can be built up from the ordered set of incident radiation intensities registered on the photo-sensitive elements. The measurement of the angle is a direct function of the distance of the image from the measurement origin in a longitudinal direction, the origin being defined by the intersection of the reference axis with the longitudinal axis of the sensor. Therefore by measuring this distance, on the basis of the geometrical characteristics of the system, it is easy to measure the angle with a good degree of precision.

It is obvious that a correct measurement depends on the ability of the receiving device (comprising the sensor) to identify the "right" light signal, i.e. the light beam used to measure the angle, distinguishing it from other light signals (disturbance) which are inevitably present in the environment in which the goniometers forming the apparatus for measuring angles of motor vehicle wheels operate.

In known apparatus immunity from this disturbance—i.e. the ability to distinguish the right source beam in order to measure the wheel angle from all the other beams in the environment, is achieved using a process in which at least two "images" are received by the receiver at two different times, characterised by two different conditions of the source producing the beam which gives rise to the signal used for measuring. In other words a reading is taken when the source is lit (so the measurement by the sensor is certain) and another measurement when the source is off (thus the correct beam is not received and is not present in the corresponding "image"). In order for this to be possible it is necessary to synchronise the state of the light source (on or off) with the reading of the two corresponding images. The identification of the image of the light signal usable for effecting the measurement by the sensor is done by a control unit which carries out a comparison process by subtraction of the two "images" acquired in the above-described conditions. The main limitation of the prior art realisations consists in the fact that it is necessary to establish a connection of some kind between the source and the receiver in order to be sure that the single acquired images are unmistakeably associated. This calls for the use of special means which lead to a certain constructional complication in the apparatus for measuring the angles which are characteristic of the wheels of the vehicles.

Other methods for excluding the disturbance in the surrounding environment, though limited in number, combine light sources with special light-emittance characteristics with optic filters positioned in front of the sensor. These devices have the drawback of being able to function correctly only where the environmental disturbance does not include characteristics which are identical or similar to those of the light emitted by the source.

The main aim of the present invention is to obviate the limitations and lacks in the prior art.

An advantage of the invention is its overall simplicity.

These aims and advantages and others besides are all achieved by the present invention, as it is characterised in the claims that follow.

SUMMARY OF THE INVENTION

In the process of the invention a light signal is produced by a light beam having a predetermined direction with respect to which an angle to be measured is measured, the angle being formed between the direction of the light beam and a reference axis of the goniometer which reference axis is perpendicular to the linear optical sensor. The linear optical sensor is constituted by a plurality of contiguous and aligned photo-sensitive elements, by means of which elements an image of the light signal can be read. The image is constituted by an ordered totality of intensities of incident radiations recorded on the photo-sensitive elements. Measurement of the angle is a direct function of a distance of the image from an origin for measurement of distances in longitudinal direction, which is defined by an intersection of the reference axis with a longitudinal axis of the sensor.

BRIEF DESCRIPTION OF THE DRAWINGS

Further advantages of the present invention will better emerge from the detailed description that follows of a preferred but non-exclusive embodiment of the invention, illustrated purely by way of non-limiting example in the accompanying figures of the drawings, in which.

DESCRIPTION OF THE PREFERRED EMBODIMENTS

Figure 1:
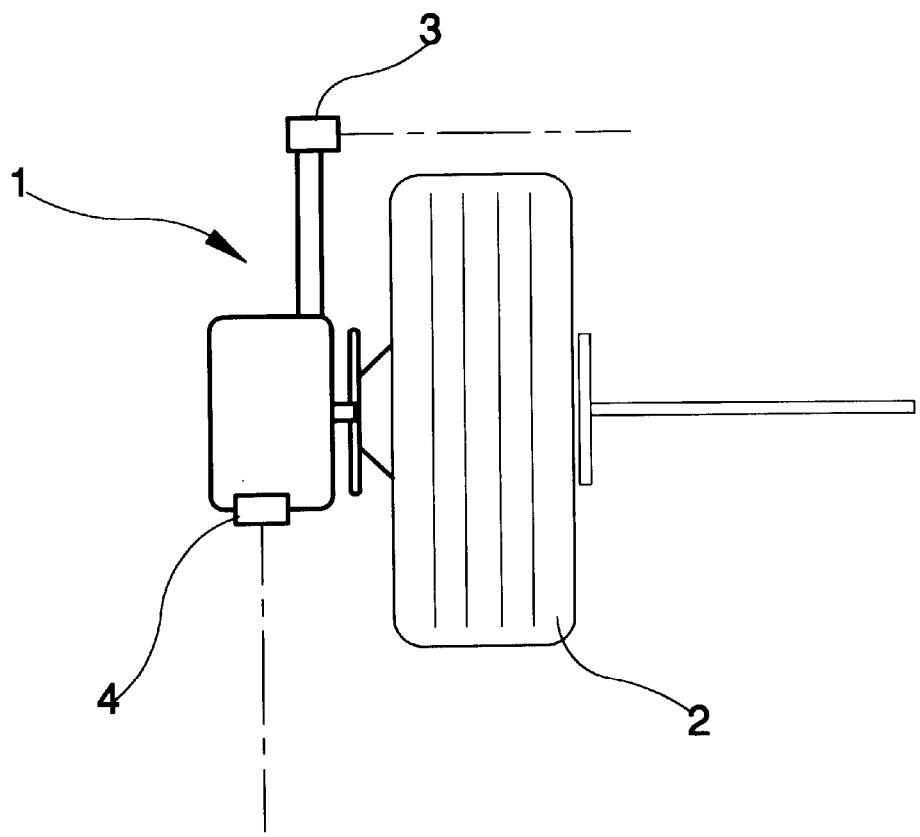
FIG. 1 is a schematic plan view of a measuring sensor applied to the wheel of a vehicle.
Figure 2:
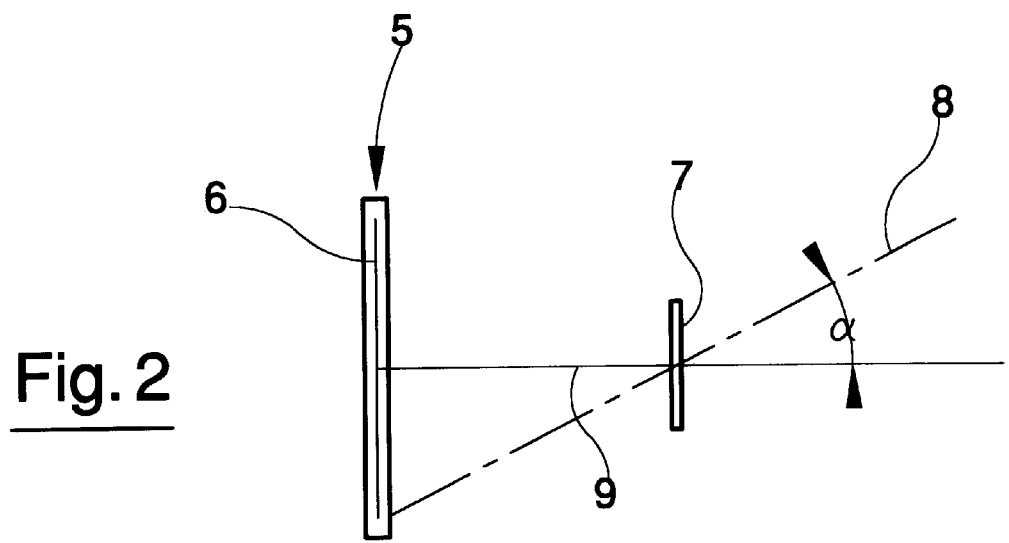
FIG. 2 is a diagram of a goniometer incorporated in the sensor of FIG. 1.
Figure 3:
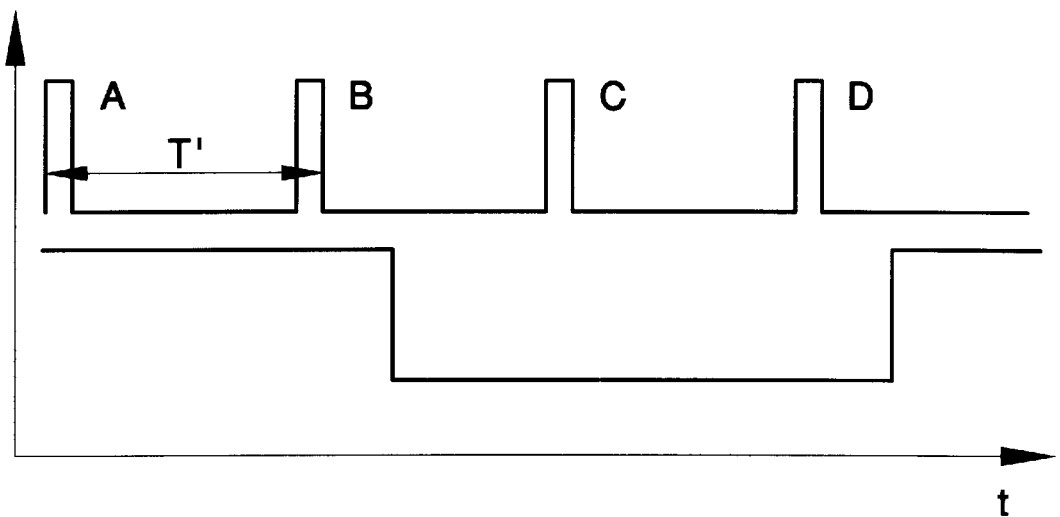
FIG. 3 is a schematic diagram of the graphs relating to the receiver and light source situations.

With reference to the figures of the drawings, 1 denotes in its entirety a measuring sensor which is solidly constrained to the rim of a wheel 2 of a motor vehicle for the purpose of determining the characteristic angles thereof. The sensor 1 comprises two optical goniometers 3 and 4 which are correlated with corresponding optical goniometers applied on three other measuring sensors mounted on the three other wheels of the vehicle.

Each optical goniometer is schematically constituted by a linear optic sensor 5 which comprises a line of photo-sensitive elements 6 and an optical device 7 which has the task of conveying a light beam 8 onto the linear sensor 6 in the direction in which the angular measurement is to be carried out. In the illustrated example the light beam 8 originates from a light associated to the measuring sensor mounted on one of the two wheels contiguous to the wheel on which the measuring sensor 1 is mounted.

The angle measured is the angle comprised between the direction of the light beam 8 and the reference axis 9 of the goniometer, which is defined as the axis of the optical device 7, which is perpendicular to the linear sensor 5 at its median point (the halfway point in the line of photo-sensitive elements 6). The plurality of photo-sensitive elements making up the linear sensor 5 gather an "image" of the light signal constituted by the ordered totality of incident radiation intensities registered on the photo-sensitive elements. The angular measurement is a direct function of the distance of the image from the origin for the measurement of the distances in a longitudinal direction defined by the intersection of the reference axis with the sensor longitudinal axis.

According to the invention, the distinction (from the environmental disturbance) of the light source emitted by the light; i.e. the data which will be used by the sensor 5 in order to make the angular measurement, comprises:

gathering at least two of the images in different and known times;

comparing the two images;

processing data which emerges from the comparison by means of a process which gives a definition of the environmental disturbance, rendering it distinguishable from the data arriving from the light signal, and vice versa.

In particular, the emission of the light signal, originating from the light beam produced by the light source, is intermittent and more or less constant. In an embodiment of the invention a plurality of the images is gathered at determined intervals of time, the actual timing of the intervals being of little importance.

A sufficient number of gathered readings renders a sufficient number of images to be compared so that a satisfactory result can be obtained.

A further embodiment of the invention could be where the light signal, originating from the light beam, is intermittent, with a variable frequency over a period of time (with an interval decided by the user), while the gathering of a plurality of the images read off is done at constant-time intervals (constant period and frequency).

In a further embodiment, where the period (constant) is only approximately known for the emission of the light signal by the light source, at least two images can be read at an interval of time (between the two) determined on the basis of the period of emission of the light signal. In particular this time interval between a reading and a next reading is timed so as not to be a full multiple of the intermittent period of emission of the light signal. This means that one of the readings is done in correspondence with the phase of non-emission of the signal by the light source.

One of the images can be read off deliberately in a controlled state of disturbance so as to put together a pattern or template of adjustment, which can be stored and used for comparison with newly-acquired images gathered during use.

At least two of these images will also be read off at an interval which will be determined according to the period of emission of the light signal—this together with the above-described template model read off under controlled conditions of disturbance. A comparison will then be made between a typical image read off during operation and the two above-cited stored data.

The comparison between the images could be made using the subtraction method.

A problem which can crop up is that in normal optical sensors the time needed to read off an image is not zero—it is of the order of a few milliseconds. If the light source changes state (from lit to off or vice versa) during these few milliseconds, the receiver will only be able to read off a fraction of the optical power of the source, which fraction will correspond to the portion of time during which the source was lit up. This will result in a sequence of images in which the source is presented at an intermediate level, making an effective subtraction of the disturbance difficult.

To add to this, the phase ratio between source and receiver is not fixed once for all times, but slowly changes due to the tolerance on the oscillator frequencies.

The problem can be resolved in various ways.

A first way can be when the source flashes at a frequency of half the maximum possible for the receiver. The receiver samples the two images which are used to make the subtraction of disturbance not in two consecutive cycles but inserting a "dry run" between two readings.

The time included between two consecutive readings is the time the sensor is exposed to the light, and is also the useful time in which sampling can be made of the signal. During certain periods, the sensor will not take in all of the power of the light source, with the ensuing above-mentioned drawback.

Two methods can be used to combat this. In the first of the two methods, the reading system on the receiver is designed to as to enable a new pair of readings to be made only after an odd number of cycles has taken place. This guarantees that even in the presence of the above-described circumstances, the system will alternatingly be able to acquire valid pairs, guaranteeing an acceptable performance if not perfect. In the second of the two methods, the reading system on the sensor is designed so as to enable a new pair of readings only after an even number of cycles has taken place. Further, the system is able to detect when an anomalous situation occurs. In this case the system inserts a further "dry" cycle only once, so as to stagger the receiver and source. This guarantees a uniform performance in any synchronisation situation, at the cost of a technical complication of no small importance.

The operation can also be done exploiting a phase stagger. In this case the source is made to flash at a maximum frequency allowed by the receiver performance. The receiver samples the two images used for the subtraction of the noise in two strictly consecutive cycles, and causes the phase between source and receiver to change significantly, so that the anomalous situation does not persist over long periods of time. This can be obtained, for example, by maintaining the basic frequencies of the receiver and the source slightly different, or by explicit intervention of the reading system which, by intervening on the receiver synchronism generation system, causes the phase to vary with respect to the light source, for example by increasing or lowering the basic frequency for a short period. This intervention in the reading system can be done periodically or on the basis of the reading of the anomalous situation, whenever it is detected.

A further method, not an alternative to the disturbance subtraction technique nor to the "model" or "template" comparison method, but operating with it to guarantee immunity from disturbance, is control of the exposition of the image sensor. The method uses the possibility of controlling the sensitivity of the sensor by controlling the time during which the photo-sensitive elements are exposed to the light signal.

Figure 4:
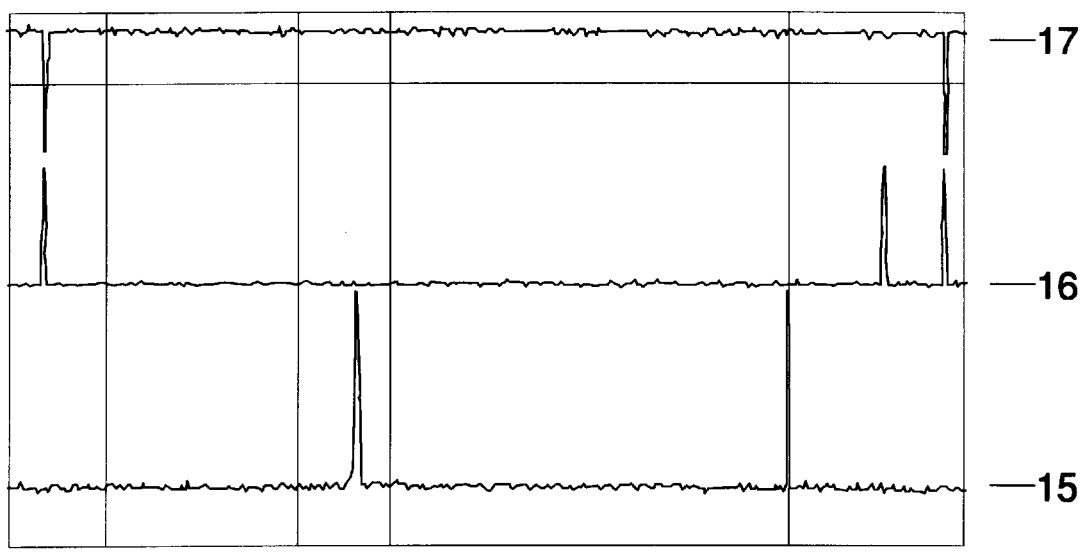
FIG. 4 shows graphs relating to the image produced on the linear sensor, of the scanned signal and the signal regulating the sensor.

This is a prerogative of new-generation linear sensors; for example, in FIG. 4 15 denotes the image produced by the light source on the sensor over the totality of the photo-sensitive elements, while 17 denotes the scan signal over the whole of the sensor and 16 the signal which, in relation to the scan, regulates the sensor exposition.

According to the invention, an analysis of the signal received, once considered valid according to the above-described techniques, means that with a simple integration operation around about the signal itself, it is possible to determine if the level of the signal is sufficient or not for the necessary processing, or whether it can be increased by means of the exposition control, i.e. increasing the sensitivity of the device in order to have a correct signal. This is very useful, for example, in order to have a same signal level both in big-wheelbase vehicles and in very small wheelbase vehicles.

A further possibility is to analyse the contents of the disturbance signal outside of but close to the useful signal, deciding for example to reduce the sensor exposition as the light in the immediate environment might bring the sensor to levels of saturation.

As the invention enables variation of device exposition on the basis of an analysis of the useful signal and the disturbance signals, each goniometer can be adjusted to account for the variable conditions of environmental light, making the system tolerant of the geometrical conditions (wheelbase) of the vehicle.

Controlling the exposition can be done separately for each goniometer 3 or 4 of FIG. 1.

What is claimed is:

1. A process for identifying a light signal used in a linear optical sensor of a goniometer, of a type used for measuring angles characteristic of wheels of a motor vehicle, in which the light signal is produced by a light beam having a predetermined direction with respect to which an angle to be measured is measured, the angle being formed between the direction of the light beam and a reference axis of the goniometer which reference axis is perpendicular to the linear optical sensor, the linear optical sensor being constituted by a plurality of contiguous and aligned photo-sensitive elements, by means of which elements an image of the light signal can be read, which image is constituted by an ordered totality of intensities of incident radiations recorded on the photo-sensitive elements, a measurement of the angle being a direct function of a distance of the image from an origin for measurement of distances in longitudinal direction defined by an intersection of the reference axis with a longitudinal axis of the sensor, comprising the steps of:

reading of at least two images at known and different times;

comparing of the at least two images;

data processing of data which emerges from the comparing of the at least two images by means of a process aimed at defining environmental disturbance, and making the environmental disturbance distinguishable from the light signal and vice versa;

wherein an emission of the light signal originating from the light beam is intermittent and has a constant or approximately constant frequency; at least two images being read at a time interval determined according to a period of emission of the light signal.

2. The process of claim 1, characterised in that the light signal originating from the light beam is intermittent and has a constant or approximately constant frequency; a plurality of the images being read at time intervals which are casually determined.

3. The process of claim 1, wherein an emission of the light signal originating from the light beam is intermittent and has a frequency which is casually variable; a plurality of the images being read at constant time intervals.

4. The process of claim 1, wherein an emission of the light signal originating from the light beam is intermittent and has a constant or approximately constant frequency; at least two images being read at a time interval determined according to a period of emission of the light signal.

5. The process of claim 4, wherein the time interval between a reading and a successive reading is not a whole multiple of the intermittent period of emission of the light signal.

6. The process of claim 1, wherein at least one of the readings of the images is done in controlled or known conditions of environmental disturbance by using a calibration operation so as to define a template which is stored and used for comparison with other: images obtained during use of the process.

7. The process of claim 1, wherein an emission of the light signal, originating from the light beam, is intermittent and has a constant or approximately constant frequency; comprising:

reading of at least two images at a time interval determined according to a period of emission of the light signal as well as reading of a template image carried out under controlled conditions of environment disturbance by using a calibration operation which is stored; a comparison being made between an image obtained during normal working conditions and the template image and the at least two images.

8. The process of claim 1, wherein the comparison between the images is calculated using a subtraction method.

9. A process for identifying a light signal used in a linear optical sensor of a goniometer, of a type used for measuring angles characteristic of wheels of a motor vehicle, in which the light signal is produced by a light beam having a predetermined direction with respect to which an angle to be measured is measured, the angle being formed between the direction of the light beam and a reference axis of the goniometer which reference axis is perpendicular to the linear optical sensor, the linear optical sensor being constituted by a plurality of contiguous and aligned photo-sensitive elements, by means of which elements an image of the light signal can be read, which image is constituted by an ordered totality of intensities of incident radiations recorded on the photo-sensitive elements, a measurement of the angle being a direct function of a distance of the image from an origin for measurement of distances in longitudinal direction defined by an intersection of the reference axis with a longitudinal axis of the sensor, comprising the steps of:

reading of at least two images at known and different times;

comparing of the at least two images;

data processing of data which emerges from the comparing of the at least two images by means of a process aimed at defining environmental disturbance, and making the environmental disturbance distinguishable from the light signal and vice versa;

wherein an emission of the light signal originating from the light beam is intermittent and has a constant or approximately constant frequency; at least two images being read at a time interval determined according to a period of emission of the light signal, and wherein at least one of the readings of the images is done in controlled or known conditions of environmental disturbance by using a calibration operation so as to define a template which is stored and used for comparison with other: images obtained during use of the process.

10. The process of claim 9, characterised in that the light signal originating from the light beam is intermittent and has a constant or approximately constant frequency; a plurality of the images being read at time intervals which are casually determined.

11. The process of claim 9, wherein an emission of the light signal originating from the light beam is intermittent and has a frequency which is casually variable; a plurality of the images being read at constant time intervals.

12. The process of claim 9, wherein an emission of the light signal originating from the light beam is intermittent and has a constant or approximately constant frequency; at least two images being read at a time interval determined according to a period of emission of the light signal.

13. The process of claim 12, wherein the time interval between a reading and a successive reading is not a whole multiple of the intermittent period of emission of the light signal.

14. The process of claim 9, wherein an emission of the light signal, originating from the light beam, is intermittent and has a constant or approximately constant frequency; comprising:

reading of at least two images at a time interval determined according to a period of emission of the light signal as well as reading of a template image carried out under controlled conditions of environment disturbance by using a calibration operation which is stored; a comparison being made between an image obtained during normal working conditions and the template image and the at least two images.

15. The process of claim 9, wherein the comparison between the images is calculated using a subtraction method.

* * * * *